Dec. 13, 1949  E. L. TORNQUIST ET AL  2,490,933
TEMPERATURE INDICATOR
Filed July 19, 1943  2 Sheets-Sheet 1
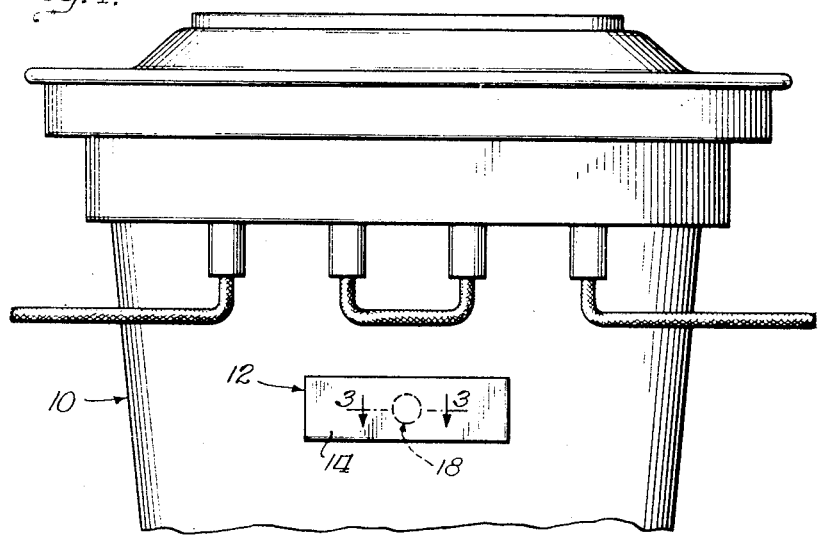
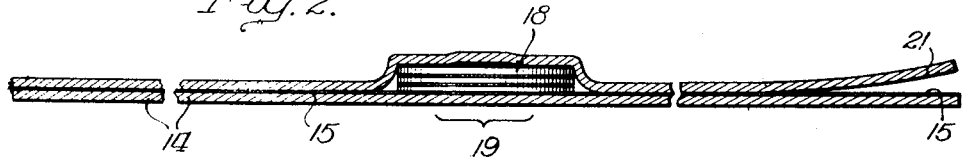
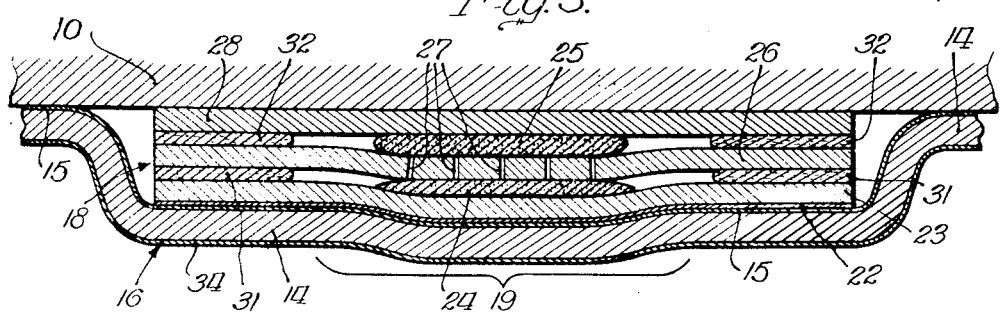
INVENTOR.
Earl L. Tornquist
William S. Guyot
BY
Attys

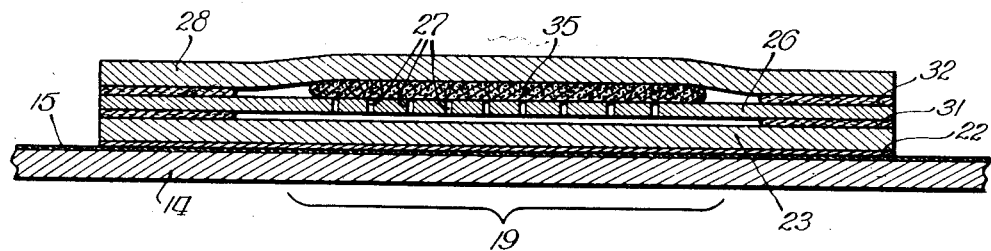
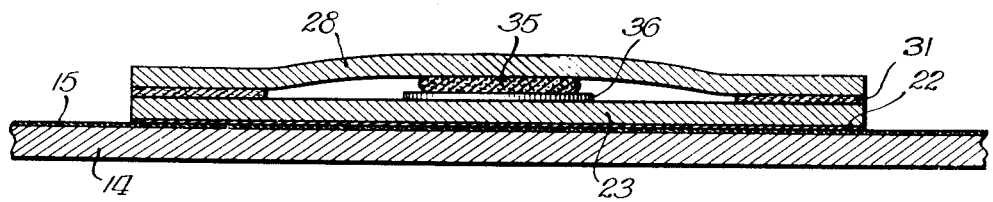
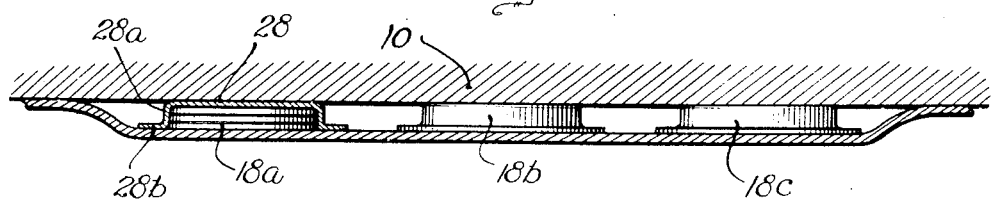

Patented Dec. 13, 1949

2,490,933

UNITED STATES PATENT OFFICE 2,490,933

TEMPERATURE INDICATOR

Earl L. Tornquist, Elmhurst, and William S. Guyot, Lombard, Ill.

Application July 19, 1943, Serial No. 495,312

15 Claims. (Cl. 73—358)

The present invention relates to an improved temperature indicator adapted for ready application to an electrical transformer housing or other electrical or mechanical device for indicating whether such device has been subjected to a predetermined temperature. This improved temperature indicator is in the form of a unitary assembly comprising a flexible mounting strip and a temperature indicating cell carried thereby. The flexible mounting strip is preferably in the form of a flexible adhesive strip adapted to be adhesively united to the outside of the transformer housing or like device, substantially in the same manner as a strip of Scotch tape would be adhesively united to the surface of the transformer. In fact, this flexible mounting strip may consist of a length of translucent Scotch tape. The temperature indicating cell is adapted to respond to the temperature of the transformer housing, and is so constructed as to give a very perceptible color indication whenever the transformer becomes overheated to a predetermined degree.

There is a great need for such a temperature indicator, particularly by electrical public service companies having thousands of transformers in continual use under varying load conditions, with no economically feasible way of determining if these transformers have been caused to operate beyond their rated temperature levels. For example, because of an abnormally high service load, or because of shorts or leaks on the service side of the transformer, or because of a faulty location, any one of these transformers may be operating at or beyond its critical temperature point, either continuously or intermittently. The result is that the life of such a transformer is greatly shortened, and failure thereof is likely to occur at any time.

Our improved temperature indicators are primarily aimed at this problem. Each one of these indicators only costs a few cents, and the application of the indicator to a transformer housing only requires a few minutes. After the indicator has served its purpose of indicating that its transformer has operated or is operating at or beyond a predetermined temperature, this indicator can be quickly stripped off the transformer housing and a new indicator quickly applied thereto for again indicating whether the transformer is becoming overheated under corrected or modified operating conditions.

It is quite desirable that the visual indication afforded by the temperature indicating cell or cells be clearly visible from a substantial distance. The majority of these transformers used in distribution systems are mounted on poles at relatively high levels, and the necessity of climbing these poles to observe the temperature indicator can be substantially reduced by affording a large, plainly visible indication. Such is one of the objects of our construction.

Another object of our construction is to provide a temperature indication which is clearly discernible to anyone, even to color blind persons. Thus, in the preferred embodiments of our invention the temperature indication is afforded by the appearance in a translucent portion of the device of a color area where previously there had been no color at all, in contradistinction to the practice of having one color change to another color, with the likelihood of confusion by color blind individuals.

Another object of our invention is to provide such a temperature indicator in which the color indication will be sharply responsive to a predetermined temperature, instead of reacting with various degrees of color indication as the rising temperature approaches this critical point. That is to say, in our improved temperature indicator there is substantially no "bleeding" of the color into the translucent indicating area as the temperature begins to approach or comes near the critical temperature, this "bleeding" being a particularly difficult thing to avoid when the temperature frequently approaches and recedes from the predetermined temperature, or is maintained near the predetermined temperature over a long interval of time.

Another object of our invention is to provide such a temperature indicator which will successfully withstand severe weather conditions, even when exposed to the elements mounted on a transformer housing carried on the top of a transformer pole.

Another object is to provide a temperature indicator of the above general description in which the indication is irreversible and substantially permanent.

Other objects, features, and advantages of the invention will appear from the following detailed description of certain preferred embodiments thereof. In the accompanying drawings illustrating such embodiments:

Figure 1 is a front elevational view of a conventional transformer showing one embodiment of our improved temperature indicator secured thereto;

Figure 2 is an enlarged longitudinal sectional view through the temperature indicator before it has been applied to the transformer, this view showing the mounting strip in section and the temperature cell in elevation, and showing the guard strip in the process of being removed from the tacky inner surface of the indicator;

Figure 3 is a longitudinal sectional view through the temperature indicator after it has been applied to the transformer housing, corresponding to a section taken on the plane of the line 3—3 of Figure 1, this figure and the following figures being greatly magnified in proportion but not necessarily drawn to scale;

Figure 4 is a sectional view similar to Figure 2 showing a modified construction;

Figure 5 is another sectional view similar to Figure 2 showing another modified construction; and Figure 6 is a sectional view showing a modified embodiment employing a plurality of temperature indicating cells which are made to be responsive to different temperatures.

In the following description we have chosen to describe our invention as applied to an electrical transformer because this represents one of the principal fields of utility of the invention, but it will be understood that the indicator can also be adhesively applied in the same manner to electric motors, generators, condensers, and other electrical devices, and also to innumerable mechanical devices such as journal boxes, bearings, fans, hot air ducts, etc.

Referring first to Figure 1, a conventional electrical transformer is indicated at 10, and mounted on the front side of this transformer we have shown one of our temperature indicators, designated 12. We have shown this indicator as secured to the front wall of the transformer housing, but it might be secured to the side or end wall, or to the bottom or any desired point. This view illustrates a relatively simple embodiment of our invention employing a single temperature responsive cell for giving a single temperature indication.

Referring now to Figure 2 illustrating this single cell embodiment of our invention before application to the transformer housing, it will be noted that it comprises a main mounting strip 14 composed of a pliable material which is quite translucent or transparent, which is moisture-proof, and which is also resistant to aging and to discolorations from sunlight. As illustrative of preferred materials for this mounting strip or tape, it may be composed of translucent Scotch tape or cellulose acetate. If wartime restrictions preclude using a full thickness of cellulose acetate for this strip, then it may have a light backing of thin semi-transparent paper laminated to the acetate sheet. The entire inner surface of this mounting base strip or tape 14 is coated with a permanently tacky adhesive 15 which is strongly hydrophobic and substantially unaffected by water or water vapor. This is preferably a rubber base adhesive, particularly from the point of prevention of edge leakage of water, but a resin base adhesive may also be used. There is now available on the market such a cellulose acetate and fiber tape having the resin base adhesive already applied to the base material, this being known as "Cellulose Acetate Fibre Tape" manufactured by Minnesota Mining and Manufacturing Company. The outer surface 16 of such mounting tape is highly resistant to weathering, so that the tape is moisture-proof and is resistant to aging and to discoloration by sunlight.

The temperature indicating cell carried by this mounting tape 14 is indicated in its entirety at 18. This indicating cell is secured to the inner or back surface of the mounting tape, and that area of the mounting tape disposed directly in front of the indicating cell constitutes a transparent or translucent viewing area 19 (Figure 3) through which the color indication made by the cell can be observed. The details of this temperature indicating cell will be described later in connection with the following figures.

During the time that the temperature indicators are being stored, shipped and handled, prior to their actual application to the transformers, the tacky inner surface 15 of each indicator is covered by a guard strip 21. This is preferably composed of a glazed textile tape, such as holland shade cloth, or it may be composed of regenerated cellulose, either material adhering to the tacky surface 15 but not allowing any of the adhesive substance of this tacky surface to permeate into itself. It thus may be easily removed without injuring or removing any of the tacky material. Just before the temperature indicator is to be applied to the transformer housing, this guard strip 21 is stripped from the tacky surface 15 so that the tacky material can be pressed into direct contact with the surface of the transformer housing, Figure 2 illustrating the right hand end of the guard strip pulled loose in the act of stripping it from the tacky surface.

Referring now to the construction of temperature indicating cell 18 shown in Figure 3, it will be noted that this cell comprises a multiple layer assembly built up of an indicator paper, spacing rings, back retaining membrane, etc., preferably cut out in the form of circular discs or rings. A disc of indicating paper 23 disposed directly back of the mounting strip 14 is adapted to receive the dye stain when the temperature sensitive material of the cell is fused at the critical temperature. It is desirable that this indicator paper 23 be spaced from the tacky substance 15 by a spacing medium or shield 22 which is preferably incompatible with organic materials such as would be found in the mounting or base strip 14 and such as are used as the temperature sensitive material and the dyestuff. For some uses, this material 22 preferably has the property of being "non-oil soluble" or "greaseproof," such being particularly exemplified by animal glue (gelatin) and sodium silicate.

The indicator paper 23 is preferably paper of a relatively pure stock capable of easily absorbing the solution of dye in the molten temperature sensitive material. A pure "water leaf" type paper is particularly desirable, but some difficulty may be encountered in applying the spacing medium or shield 22 when using such paper. However, this difficulty only arises when the paper stock must be purchased with the coating already applied. If this or an equivalent paper can be obtained without the coating, it is entirely practicable. A gummed sulfite stock paper typically represented by "Everett Grade Gummed Paper," and gummed sulfite stock papers such as are used for decalcomanias, have been used by us with satisfactory results.

Confined directly in rear of the indicator paper 23 is a quantity of dye 24 which is adapted to strike through and stain the indicator paper when the dye is dissolved by the action of the temperature sensitive material 25 passing into its liquid state. In the embodiment illustrated in Figure 3, the dye 24 and the temperature sensitive material 25 are normally separated by a permeable shield membrane 26. The shield 26 is punctured by a plurality of needle holes 27 which do not permit passage of the temperature responsive material 25 therethrough while said material is in its non-fused or dry state, but which readily permit this temperature responsive material to flow therethrough when the latter is fused at the critical temperature. The cell assembly 18 is completed by a back membrane 28 which retains the temperature responsive material 25 in contact with the shielding membrane 26. The three discs or membranes 23, 26 and 28 are all secured together around their circular edges by circular rings of adhesive 31 and 32.

Referring now to the preferred properties of the dye material 24, this dye must be one which is soluble in the liquid phase of the temperature sensitive material 25. Preferably, it should be the pure dyestuff containing no "wetting agents" and the like commonly found in commercial dyes, which would lower the melting point of the temperature sensitive material 25 if mixed with it. The so-called "oil soluble" type of dyestuffs are suitable for use with the solvents herein disclosed. It should not be water soluble to any appreciable degree, where the indicator is to be used under moist conditions and is to be in place for any length of time. It should be stable at the highest temperature which will be encountered in operation. If it should be mixed with the temperature sensitive material 25, this resulting mixture may have an appreciably lower melting point than that of the temperature sensitive material alone, and this should be considered in adopting the mixture for use. A small percentage of dye dissolved in the fusible solvent is effective, such as 10–20% of any of the dyes herein listed and any of the solvents herein listed. The following are examples, giving melting points:

|   | Mixture | Melting Point |
|---|---------|---------------|
|   |         | °C. |
| 1 | Stearic Acid—80%<br>Calcophen Red Y—20% (Amer. Prototype #3698) | 68 |
| 2 | Myristic Acid—80%<br>Calcophen Red Y—20% (Amer. Prototype #3698) | 51 |
| 3 | Cyclohexyl Maleate—90%<br>Calcophen Red Y—10% (Amer. Prototype #3698) | 79 |

It is desirable that the dye have a strong color. Thus, "Yellow AB" C. I. #22 is generally satisfactory, but if the indicator must be observed from a distance, then this yellow color is not as desirable as the stronger colors, such as red. The dyestuff preferably should not have an unctuous nature when used as in Figure 3, or be such that on long contact it will stain the indicator paper 23 at low temperatures. This is another reason why water soluble dyes are not as desirable as oil soluble dyes. As examples of dyes which we have used successfully we list the following:

Calcophen Red Y (Amer. Prototype #3698)
Sudan III (C. I. #248)
Sudan IV (C. I. #258)
Yellow OB (C. I. #61)
Yellow AB (C. I. #22)

Referring now to the required or desired properties of the temperature sensitive material 25, this should have a sharp melting point, preferably within 1° to 2° C. for accurate work. This requires the use of pure materials. When melted this temperature sensitive material 25 must dissolve "oil soluble" type of dyes easily and with a bright color. The temperature sensitive material should have a relatively low vapor pressure at temperatures up to its melting point (e. g. vanillin is not entirely satisfactory due to its high vapor pressure). When melted, this material must be absorbed easily by the indicator paper 23. It should be stable at temperatures encountered in use; and should be a solid free from danger of softening until the desired temperature is attained. Preferably this material should be such that it can be formed into pellets or lumps, or it should be capable of crystallization into crystals of suitable size which retain their shape. A suitable size may be in the neighborhood of ¼ inch diameter x 3/16 inch thick. As preferred examples of this temperature sensitive material 25, we list the following:

Myristic acid, M. P. 52–53° C.
Stearic acid, M. P. 69–70° C.
Cyclohexyl maleate, M. P. 82–83° C.
Guaicol benzoate, M. P. 55–57° C.
Palmitic acid, M. P. 61–62° C.

Referring now to the required or desired properties of the spacing shield membrane 26, any material may be used which is not penetrated by the temperature sensitive material 25 on long contact at temperatures below the melting point of the temperature sensitive material, and which is stable mechanically and chemically at temperatures up to the melting point of the temperature sensitive materials. This membrane may be composed of such non-metallic materials as, for example, paper saturated and/or coated with sodium silicate or the like, or the membrane may be composed of metal foil. This material is used as a thin sheet or foil disc which is punctured by a needle at seven or eight points in the central portion of the disc to provide the needle perforations 27. Satisfactory results have been obtained when this membrane has been composed of aluminum foil, lead foil, and "composition" (a tin-lead alloy) foil. These range in thickness from .00045" to .0025".

Referring now to the properties of the adhesive 31, 32 used to fasten the edges of the membranes 23, 26 and 28 together, this adhesive preferably should be "non-oil soluble" and have no effect either chemically or mechanically on the temperature sensitive material 25 or dye 24. However, this is not essential because it need not contact the solvent 25 until the latter fuses. It is preferably impervious to the passage of the liquid temperature sensitive material or the solution of dye in the temperature sensitive material. The most suitable materials which have been used by us are viscous solutions of sodium silicates, such as "N" brand or "Seal" brand (as supplied by Philadelphia Quartz Company). The suitability of these sodium silicate solutions is enhanced by their rapid setting time which allows more rapid and easy construction of the envelope assembly of mounting strip 14 and cell 18.

Referring now to the retaining membrane 28 which backs up the cell, it is possible to use any sheet material which is inert to the temperature sensitive material 25 and which is not subject to grease absorption from the surface of the transformer housing 10 or other device. However, much better temperature characteristics are obtained if metal foil is used for this retaining membrane. We have used lead, "composition" (tin-lead alloy) and aluminum foil. Paper may be used but, if so, it must be coated with glue or a glass-like film of sodium silicates laid down in a viscous solution on the outside face to protect the latter from absorption of grease and oil. Referring now to the thermal action taking place through the foil 28, this foil allows rapid heat transfer to the temperature sensitive material 25. The various air spaces and the non-metallic materials which lie over the outer side of the temperature sensitive material 25 prevent heat loss to the outside, and thus only a small percentage of the overall temperature gradient (between the surface 10 whose temperature is to be measured and the outside air) exists between the surface 10, whose temperature is to be measured, and the temperature sensitive material 25.

In applying the above described temperature indicator to a transformer housing 10, the desired spot on the housing is preferably wiped clean of grease and dirt, and thereupon the guard strip 21 is stripped off the tacky inner surface 15 of the mounting strip 14 and this tacky surface pressed firmly against the transformer housing. In order to obtain a very long life, particularly under severe weathering conditions, it may be desirable to apply a coat of spar varnish over the whole envelope, such being indicated at 34 in Figure 3. This is done primarily to seal the edges against weather, especially if wartime restrictions preclude the use of rubber base adhesives.

In the operation of the above described embodiment, it will be understood that if the transformer becomes overloaded or tends to overheat for any other reason, this higher temperature is immediately transmitted to the temperature sensitive material 25. When this temperature transmitted to the material 25 reaches the critical melting temperature of said material, the latter immediately flows through the needle perforations 27 in the spacing shield 26 and enters into solution with the dye 24. This liquid, consisting of the temperature sensitive material and the dye, immediately penetrates the indicator paper 23, completely saturating this portion of the paper and affording a permanent tell-tale indication through the translucent viewing or indicating area 19 of the mounting strip 14. The tell-tale stain of the indicator paper 23 remains even though the temperature of the transformer should subside to a lower permissible temperature, the permanent stain of the paper serving to indicate to an inspector checking the transformer at a later date that the transformer has been subjected to a predetermined temperature rise, or to a temperature rise beyond a critical level. After correcting the conditions which have caused this undesirable temperature rise, the old temperature indicator is stripped off the transformer housing and a new temperature indicator applied thereto so that another temperature indication will again be made if the transformer should again reach a critical temperature. Various temperatures may be predetermined in advance as critical temperatures, depending upon load conditions, climatic conditions, etc., these usually coming somewhere between 125° F. and 175° F.

Referring now to the modified construction illustrated in Figure 4, this is the same as the construction shown in Figure 3 except that the dye 24 and the temperature sensitive material 25 are both mixed together to form a single physical mixture indicated at 35. This mixture is confined between the shield membrane 26 and the heat transmitting membrane 28. The dyestuff is preferably similar to the above described dyestuff 24, and the temperature sensitive material is preferably similar to the above described material 25. The two may be merely mixed, or be fused together, to form a homogeneous mass which may then be used as crystals, lumps or pellets. All other parts of this embodiment are the same as described above of the preceding embodiment. In the operation of this latter embodiment it will be obvious that when the temperature sensitive material passes into liquid phase at the critical temperature, the resulting solution of temperature sensitive material and dyestuff quickly passes through the needle holes 27 in the spacing disc 26 and stains the indicator paper 23.

Referring now to the modified embodiment illustrated in Figure 5, in this construction the temperature sensitive material and the dyestuff are also mixed or fused together to form a physical mixture or homogeneous mass 35, but this mixture, when brought to the liquid state by the critical temperature, acts around the edge of a shield instead of through perforations in the shield. In this instance, the shield 36 is in the form of a relatively small disc or film, only slightly larger in diameter than the pellet 35 of temperature responsive material and dyestuff. The rear temperature transmitting ply 28 is spaced from the indicator paper 23 around the edges of the shield 36 so that when the mixture 35 melts to the liquid state, this liquid is free to flow quickly around the edges of the circular shield 36 and stain the indicator paper, substantially the same as above described. However, it will be noted that in this latter embodiment, the indicating stain will have the appearance of a color ring characterized by a neutral or unstained central area. The shield 36 should preferably have the same properties as the shield 26 of the preceding embodiments, except that it may be laid down directly on the indicator paper 23 as a film. We have found animal glue and sodium silicate to be suitable materials for this purpose. The other parts of this modified construction are preferably the same as those described above.

In Figure 6 we have illustrated still another modified construction comprising a plurality of temperature indicating cells. In this embodiment three cells 18a, 18b and 18c are all mounted in side-by-side relation on the mounting strip 14. These three cells are provided with different temperature sensitive materials 25 having different melting points. Thus, three different temperature indications are made available, which may be preselected for any desired range of conditions. For example, these might be chosen to indicate (1) a predetermined nearness or approach to a critical temperature, (2) the attainment of this critical temperature, and (3) a predetermined excess of temperature beyond the critical temperature. If desired, different colored dyestuffs may be used in each of the three cells to give three distinctive color indications. In this multiple cell embodiment we have also illustrated a slightly different construction of cell which may be incorporated in either of the embodiments illustrated in Figures 3, 4, and 5. This different construction resides in forming the back membrane or heat transmitting ply 28 of larger diameter, and then shaping or crimping its edge portion forwardly and then laterally to form the surrounding wall portion 28a and the outwardly radiating flange portion 28b. The wall portion 28a completely surrounds and encloses the other elements making up the cell, and the outwardly radiating flange 28b is adhesively joined to the tacky inner surface 15 of the mounting strip 14. Thus, the heat transmitting or foil member 28 thereby aids in protecting the interior portion of the cell from the weather, and such greater area of foil also increases the effective area for transmitting heat from the transformer housing to the temperature responsive material 25 or 35.

While we have illustrated and described what we regard to be the preferred embodiments of our invention, nevertheless it will be understood that such are merely exemplary and that numerous modifications and rearrangements may be made therein without departing from the essence of the invention. In this regard, we wish to again point out that although our improved temperature indicator appears to have its greatest field of utility in connection with electrical transformers, nevertheless the device is not limited to this use but can also be used to indicate temperatures which have developed in various other electrical and mechanical devices or units, such as electric motors, electric generators, electric condensers, journal boxes, bearings, etc.

We claim:

1. A temperature-indicator for application to a surface to indicate the attainment of a predetermined temperature, comprising essentially an indicating layer of absorbent material which is thermally stable at said predetermined temperature, a source of normally solid fusible color-solvent which melts sharply at said predetermined temperature, said absorbent material being physically inert toward said solvent in fused form except for the property of absorbing the fused solvent, said source and said indicating layer being carried in a unitary assembly adapted to be mounted on a surface to be tested, said source being carried in said assembly between said indicating layer and said surface when said assembly is so mounted, and in position to strike into said indicating layer on fusion, and a source of solid color soluble in said fused solvent located between said indicating layer and said surface when the assembly is so mounted in position to provide upon fusion of the solvent a colored fused solvent for striking into said indicating layer, whereby upon attainment of said predetermined temperature by said surface the color-stain of said indicating layer indicates the said attainment.

2. In a temperature indicator, the combination of a flexible mounting strip having a tacky inner surface and a weather resistant outer surface, a guard strip adhering to said tacky inner surface, said guard strip being adapted to be stripped from said mounting strip when the indicator is to be put into use, said tacky inner surface being thereupon pressed into direct contact with a heat emanating surface of the device whose temperature is to be measured, said mounting strip including a translucent portion, and a temperature indicating cell carried by said mounting strip on the inner side of said translucent portion, said cell comprising a temperature sensitive material adapted to be held in close heat absorbing relationship to said heat emanating surface and adapted to be melted when said surface attains a predetermined temperature, a dye adapted to be dissolved by and to color said temperature sensitive material when said temperature sensitive material melts, and an absorbent material having an indicating surface behind said translucent portion adapted to be stained by said colored temperature sensitive material to afford the temperature indication.

3. In a temperature indicator, the combination of a flexible mounting strip having a tacky inner surface and a weather resistant outer surface, a guard strip adhering to said tacky inner surface but adapted to be stripped therefrom when the indicator is to be put into service, said tacky inner surface being thereupon pressed into direct contact with a heat emanating surface of the device whose temperature is to be indicated, said mounting strip including a translucent portion, and a temperature indicating cell carried by said mounting strip on the inner side of said translucent portion, said cell comprising an indicating layer of absorbent material which is thermally stable at the predetermined temperature to be indicated, a source of normally solid fusible color-solvent which melts sharply at said predetermined temperature, said indicating layer of absorbent material being physically inert toward said solvent in fused form except for the property of absorbing the fused solvent, said source being carried in said temperature indicating cell between said indicating layer and said heat emanating surface when the temperature indicator is mounted on said device, said source being in position to strike into said indicating layer on fusion, and a source of solid color soluble in said fused solvent located between said indicating layer and said heat emanating surface to provide upon fusion of the solvent a colored fused solvent for striking into said indicating layer, whereby upon attainment of said predetermined temperature by said surface the color stain of said indicating layer indicates the said attainment.

4. In a temperature indicator, the combination of a flexible mounting strip having a tacky inner surface and a weather resistant outer surface, said tacky inner surface being adapted to be pressed into direct contact with a heat emanating surface of the device whose temperature is to be indicated, said mounting strip including a translucent portion, and a temperature indicating cell carried by said mounting strip on the inner side of said translucent portion, said cell comprising a temperature sensitive material adapted to be held in close heat absorbing relationship to said heat emanating surface and adapted to be melted when said surface attains a predetermined temperature, a dye adapted to be dissolved by and to color said temperature sensitive material when said temperature sensitive material melts, and an absorbent material having an indicating surface behind said translucent portion into which the molten colored temperature sensitive material flows to afford the temperature indication.

5. In a temperature indicator for attachment to the heat emanating surface of a device susceptible to objectionable temperature rise, the combination of a flexible translucent mounting strip, a temperature indicating cell mounted on the inner surface of said mounting strip, said inner surface having a tacky substance adjacent said cell, said tacky substance being adapted to be pressed into adhesive engagement with said device to hold said cell in intimate contact with said heat emanating surface, said cell comprising a temperature sensitive material adapted to melt when said heat emanating surface reaches a predetermined temperature, a dye which is dissolved by the melting of said temperature sensitive material, and an absorbent material having an indicating surface visible through said translucent mounting strip adapted to be stained by said dye when dissolved.

6. In a temperature indicator for attachment to the heat emanating surface of a device for indicating the attainment of a predetermined temperature by that device, the combination of a flexible mounting strip at least a portion of which is translucent, said mounting strip having a tacky inner surface adapted to be pressed into adhesive engagement with said device, an indicating layer of absorbent material carried by said flexible mounting strip in a position behind said translucent portion, and fusible temperature sensitive means carried by said flexible mounting strip in a position behind said indicating layer of absorbent material, whereby said fusible temperature sensitive means is normally not visible through said translucent portion but whereby upon becoming fused said temperature sensitive means can flow into said indicating layer of absorbent material and thereby effect a visible change in said indicating layer for establishing a visual indication that said device has attained a predetermined temperature.

7. In a temperature indicator for attachment to the heat emanating surface of a device for indicating the attainment of a predetermined temperature by that device, the combination of a flexible mounting strip at least a portion of which is translucent, said mounting strip having a tacky inner surface adapted to be pressed into adhesive engagement with said device, an indicating layer of absorbent material carried by said flexible mounting strip in a position behind said translucent portion, fusible temperature sensitive means carried by said flexible mounting strip in a position behind said indicating layer of absorbent material, whereby said fusible temperature sensitive means is normally not visible through said translucent portion, and color means cooperating with said fusible temperature sensitive means whereby when the latter becomes fused it conveys said color means into said indicating layer of absorbent material and thereby effects a visible color change in said indicating layer for establishing a visual indication that said device has attained a predetermined temperature.

8. In a temperature indicator for attachment to the heat emanating surface of a device for indicating the attainment of predetermined temperatures by that device, the combination of a flexible translucent mounting strip having a tacky inner surface adapted to be pressed into adhesive engagement with said device, a plurality of different temperature indicating cells having different temperature responsive points carried in physically separated relation on the inner side of said translucent mounting strip and adapted to be held in intimate association with said heat emanating surface, each of said temperature indicating cells comprising an indicating layer of absorbent material which is thermally stable at the predetermined temperature to be indicated, a source of normally solid fusible color-solvent which melts sharply at the responsive temperature predetermined for that particular temperature indicating cell, said indicating layer of absorbent material being physically inert toward said solvent in fused form except for the property of absorbing the fused solvent, said source being carried in said temperature indicating cell between said indicating layer and said heat emanating surface when the temperature indicator is mounted on said device, said source being in position to strike into said indicating layer on fusion, and a source of solid color soluble in said fused solvent located between said indicating layer and said heat emanating surface in each cell to provide upon fusion of the solvent a colored fused solvent for striking into said indicating layer, whereby upon attainment of the different predetermined temperatures by said surface the color stains of said indicating layers in the different temperature indicating cells indicate the attainment of said temperatures.

9. In a temperature indicator for attachment to the heat emanating surface of a device for the purpose of indicating the attainment of a predetermined temperature by that device, the combination of a flexible translucent mounting strip having a tacky inner surface adapted to be pressed into adhesive engagement with said device, temperature sensitive material carried by said mounting strip, a dye carried by said mounting strip, a dye carried by said mounting strip, a perforated shield normally spacing said temperature sensitive material from said dye, and in indicating media carried by said mounting strip for staining by said dye, said temperature sensitive material being adapted to melt substantially at said predetermined temperature so as to flow through the perforations in said shield for mixing with said dye to stain said indicating media, whereby to afford a visual indication through said mounting strip when said device attains said predetermined temperature.

10. In a temperature indicator for attachment to the heat emanating surface of a device for indicating the attainment of a predetermined temperature by that device, the combination of a flexible mounting strip having an adhesive surface on its inner side adapted to be mounted directly on said device, said mounting strip comprising a translucent portion, temperature sensitive material carried by the inner side of said mounting strip and adapted to be held in good thermal contact with said heat emanating surface so as to melt substantially at said predetermined temperature, a dye substance carried by said mounting strip adapted to be placed in solution by the melting of said temperature sensitive material, and indicating media carried by said mounting strip and adapted to be stained by said dye in solution to afford a visual indication through said translucent portion when said device attains said predetermined temperature.

11. In a temperature indicator for attachment to the heat emanating surface of a device for indicating the attainment of a predetermined temperature by that device, the combination of a mounting means adapted to be mounted on said device, and temperature responsive indicating means carried by said mounting means, said temperature responsive indicating means comprising normally solid means which responds to the attainment of said predetermined temperature by melting and becoming a liquid coloring medium, an absorbent material having a visual indicating surface adapted to be stained by said liquid coloring medium, and means for maintaining physical separation between said normally solid means and said absorbent material when said normally solid means is in the solid state, but which allows substantially free access of the said normally solid means to said absorbent material when said normally solid means has melted to become a liquid coloring medium, thereby preventing said indicating surface from being falsely stained by bleeding of said normally solid means at temperatures below said predetermined temperature.

12. In a temperature indicator for attachment to the heat emanating surface of a device for indicating the attainment of a predetermined temperature by that device, the combination of a mounting means adapted to be mounted on said device, said mounting means comprising a translucent portion and temperature responsive indicating means carried by said mounting means, said temperature responsive indicating means comprising temperature sensitive material adapted to melt when said device attains said predetermined temperature, a dye adapted to be dissolved by said temperature sensitive material upon the melting of the latter, an absorbent material having a visual indicating surface adapted to be stained by said dyed liquid, and a perforated shield normally spacing said dye from said indicating surface, said dyed liquid adapted to flow through the perforations in said shield to stain said indicating surface when said dye becomes dissolved in said molten temperature sensitive material.

13. In a temperature indicator for attachment to the heat emanating surface of a device for indicating the attainment of a predetermined temperature by that device, the combination of a mounting means adapted to be mounted on said device, and temperature responsive indicating means carried by said mounting means, said temperature responsive indicating means comprising temperature sensitive material adapted to melt when said device attains said predetermined temperature, a dye adapted to be dissolved by said temperature sensitive material upon the melting of the latter, an absorbent material having a visual indicating surface adapted to be stained by said dyed liquid and a solid shield normally spacing said dye from said indicating surface, said dyed liquid adapted to flow around the edge of said shield to stain said indicating surface when said dye becomes dissolved in said molten temperature sensitive material.

14. In a temperature indicator for attachment to the heat emanating surface of a device for indicating the attainment of a predetermined temperature by that device, the combination of mounting means adapted to be mounted on said device, a pellet carried by said mounting means comprising a physical mixture of a temperature sensitive material and a dye, said temperature sensitive material adapted to melt when said device attains said predetermined temperature and said dye adapted to be dissolved by said temperature sensitive material upon the melting of the latter, an absorbent material having a visual indicating surface adapted to be stained by said dyed liquid, and a solid shield normally spacing said pellet from said indicating surface, said dyed liquid adapted to flow around the edge of said shield to stain said indicating surface when said dye becomes dissolved in said molten temperature sensitive material.

15. In a temperature indicator for attachment to the heat emanating surface of a device for indicating the attainment of a predetermined temperature by that device, the combination of mounting means adapted to be mounted on said device, a pellet carried by said mounting means comprising a physical mixture of a temperature sensitive material and a dye, said temperature sensitive material adapted to melt when said device attains said predetermined temperature and said dye adapted to be dissolved by said temperature sensitive material upon the melting of the latter, an absorbent material having a visual indicating surface adapted to be stained by said dyed liquid, and shield means maintaining physical separation between said pellet and said absorbent material when said pellet is in the solid state, but which allows substantially free access of the dyed liquid to said absorbent material when said dye becomes dissolved in said molten temperature sensitive material.

EARL L. TORNQUIST.
WILLIAM S. GUYOT.

REFERENCES CITED

The following references are of record in the file of this patent:

UNITED STATES PATENTS

| Number | Name | Date |
| --- | --- | --- |
| 1,535,536 | MacDonald | Apr. 28, 1925 |
| 1,676,536 | Ferkel | July 10, 1928 |
| 1,668,090 | Spencer | May 1, 1928 |
| 2,049,867 | Richards | Aug. 4, 1936 |
| 2,269,038 | Perry | Jan. 6, 1942 |
| 2,308,087 | Lappala | Jan. 12, 1943 |

Certificate of Correction

Patent No. 2,490,933 December 13, 1949

EARL L. TORNQUIST ET AL.

It is hereby certified that errors appear in the printed specification of the above numbered patent requiring correction as follows:

Column 12, lines 22 and 23, strike out the words and comma "a dye carried by said mounting strip,"; line 26, for "and in" read *and an*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*